(12) United States Patent
Pasquale (10) Patent No.: US 10,731,966 B2
(45) Date of Patent: Aug. 4, 2020

(54) OPTICAL SYSTEM FOR MEASURING CONTACT STRENGTH BETWEEN PANTOGRAPH AND OVERHEAD LINE

(71) Applicant: MER MEC S.p.A., Monopoli (IT)

(72) Inventor: Antuofermo Pasquale, Monopoli (IT)

(73) Assignee: MERMEC S.p.A., Monopoli (BA) (IT)

( * ) Notice: Subject to any disclaimer, the term of this patent is extended or adjusted under 35 U.S.C. 154(b) by 0 days.

(21) Appl. No.: 16/094,467

(22) PCT Filed: Apr. 19, 2017

(86) PCT No.: PCT/IB2017/052222
§ 371 (c)(1),
(2) Date: Oct. 18, 2018

(87) PCT Pub. No.: WO2017/182954
PCT Pub. Date: Oct. 26, 2017

(65) Prior Publication Data
US 2019/0126777 A1    May 2, 2019

(30) Foreign Application Priority Data
Apr. 19, 2016  (IT) .......................... 102016000039773

(51) Int. Cl.
*G01B 11/14* (2006.01)
*B60L 5/26* (2006.01)
(Continued)

(52) U.S. Cl.
CPC ................ *G01B 11/14* (2013.01); *B60L 3/12* (2013.01); *B60L 5/26* (2013.01); *B60M 1/28* (2013.01);
(Continued)

(58) Field of Classification Search
CPC ... B60L 3/12; B60L 5/26; G01L 1/248; G01L 1/2225; G01L 5/047; G01L 3/24;
(Continued)

(56) References Cited

U.S. PATENT DOCUMENTS

| 7,492,448 B2 * | 2/2009 | Blair ...................... B60L 5/205 356/141.5 |
| 2003/0142297 A1 * | 7/2003 | Casagrande ............. B60M 1/28 356/237.2 |

(Continued)

FOREIGN PATENT DOCUMENTS

EP     2821747     *   7/2015

*Primary Examiner* — Harshad R Patel
*Assistant Examiner* — Nigel H Plumb
(74) *Attorney, Agent, or Firm* — R. Ruschena Patent Agent, LLC (57) ABSTRACT

An optical system for measuring position and acceleration of the sliding bow of a pantograph, and the contact force between the sliding bow and the catenary suspension line, comprising: at least a camera installed on the ceiling of a railway vehicle and configured so that a region containing at least a portion of said sliding bow is framed; at least a laser focused on a laser sheet arranged on a substantially vertical plane and directed towards said pantograph, said laser sheet intersecting said region framed by said camera, at least a target installed integrally to said sliding bow. The system is characterized in that, in order to increase the intensity of light reflected towards the camera, said target is cylindrical, realized in material reflecting to the frequency of the light emitted by said laser and positioned with its axis parallel to the sliding bow axis, in a position where it is lighted by said laser and framed by said camera.

10 Claims, 9 Drawing Sheets

(51) Int. Cl.
   *G01B 11/00*   (2006.01)
   *B60M 1/28*   (2006.01)
   *B60L 3/12*   (2006.01)
   *G01L 1/24*   (2006.01)
   *G01L 5/04*   (2006.01)

(52) U.S. Cl.
   CPC ............ *G01B 11/005* (2013.01); *G01L 1/248* (2013.01); *G01L 5/047* (2013.01); *B60L 2200/30* (2013.01)

(58) Field of Classification Search
   CPC ........ G01L 9/0011; G01L 11/02; G01P 21/00; G01P 15/18; G01P 15/093; G04D 7/004; G03B 43/00; G01B 11/14; G01B 11/005
   See application file for complete search history.

(56) References Cited

U.S. PATENT DOCUMENTS

| | | | |
|---|---|---|---|
| 2012/0013743 A1* | 1/2012 | Tanarro Marquez ..... | B60L 5/26 348/148 |
| 2013/0287262 A1* | 10/2013 | Blair ........................ | B60M 1/28 382/106 |
| 2015/0124239 A1* | 5/2015 | Briand .................... | B60M 1/28 356/4.08 |
| 2016/0090007 A1* | 3/2016 | Buehs .................... | B60L 5/045 191/33 R |

* cited by examiner

OPTICAL SYSTEM FOR MEASURING CONTACT STRENGTH BETWEEN PANTOGRAPH AND OVERHEAD LINE

BACKGROUND OF THE INVENTION

1. Field of the Invention

The present industrial invention relates to an optical system for measuring position and acceleration of the sliding bow of a pantograph, and the contact force between sliding bow and catenary suspension line.

2. Brief Description of the Prior Art

Electrical trains are supplied by means of a wire (contact wire) suspended along the track to posts or portals, or to special supports installed on tunnel ceilings. Since the contact wire is suspended to a support cable in a plurality of points, the geometrical shape it takes is the one of a catenary. Hence, in the following the contact wire is indicated also with the term "catenary suspension line".

Locomotives absorb energy from the contact wire by using one or more pantographs installed on the ceiling. Each pantograph is provided on the upper portion with conductive strips which are put in contact with the catenary suspension line through the force exerted by a mechanical or air spring. The interaction force between pantograph and catenary suspension line is one of the parameters mainly influencing the electric supply performance.

Due to the contact between catenary suspension line and pantograph, the conductive strip gets worn during time: so, it is suitable to limit, as far as possible, the interaction forces so that pantograph wear is reduced and deformations of the structure supporting the catenary suspension line are avoided.

On the other hand, when contact force between pantograph and catenary suspension line is reduced or nullified, a contact loss can occur, with a series of negative consequences. In prim is, performance in terms of current picking up is reduced visibly, and secondarily, sparks and electrical arcs occur, which cause not only damages both to pantograph and catenary suspension line, but are also cause of a significant electromagnetic pollution.

So, it is clear that the position of pantograph and the contact force between pantograph and catenary suspension line are essential, and that they have to be controlled At the state of the art, there are known many kinds of systems for measuring the pantograph position and the contact force between pantograph and catenary suspension line.

The most common measuring methods are based on sensors and transducers installed on the pantograph and able to pick up and transmit data relating to the interaction forces. All these methods are disadvantageous in that they are excessively invasive since they modify the dynamic and above all, the aerodynamic features of pantograph. They have further the considerable difficulty to manage the separation between the measuring devices and the high voltage portion of the system.

There are also known optical measuring systems, which allow to measure the pantograph position, and in some cases to estimate the contact force between pantograph and catenary suspension line by means of linear or matrix cameras.

A first example of this kind of system is described in the Japanese Patent JP2002-279409 where a device is described, which is able to acquire a plurality of images of pantograph through a linear sensor, to obtain a space-time image by means of sequential approaching of said images and to identify by means of a mobile media process the pantograph position in time and acceleration.

The effectiveness of such a system depends strongly on the environmental conditions. In fact, it can happen that the linear sensor acquires in the dark (at night or in a tunnel), with the sun at rear or against the light, and this variability influences considerably the quality of the acquired image, thus making the system not reliable.

A development of the cited system is described in the Japanese Patent JP2008-104312, which describes a system in that a linear sensor acquires sequentially images of pantograph on which a target is constrained. The target comprises a high reflecting strip interposed between two not reflecting strips. Therefore, in the acquired image it is to be individuated the pattern corresponding to the three target strips, and so, the position of pantograph is found out. A development of this system is described in Patent JP2009-244023.

In the Koyama et al article (Measurement of the contact force of the pantograph by image processing technology—Quarterly Report of RTRI, vol. 55, no. 2, May 2014), it is described an optical method for measuring the contact force between pantograph and catenary suspension line. The method starts from the consideration that the contact force is the sum of aerodynamic force (function of train speed), elastic force (function of pantograph position) and inertia force (function of pantograph acceleration.

By measuring with an optical system substantially identical to the just described ones (which uses a target with a plurality of white and black strips) the pantograph position in time, and by deriving then the acceleration, and acquiring the train speed, the three just described forces are estimated, whose resultant is the contact force between pantograph and catenary suspension line. Another example of a system, which uses a target provided with white and black strips, is described in document EP2404777. The target described in this document is a flat adhesive sticker comprising two strips in retroreflecting material, able to reflect light in roughly the same direction, but in opposite sense with respect to the direction it comes from.

Figure 7:
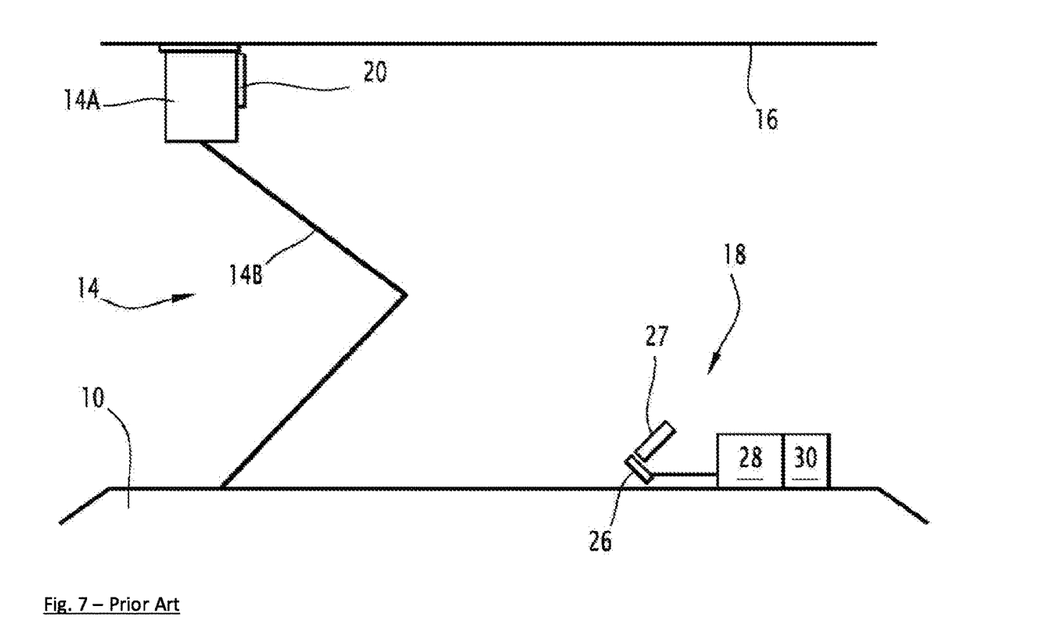
In FIGS. 7 and 8 there are shown two embodiments, known at the state of the art.
Figure 8:
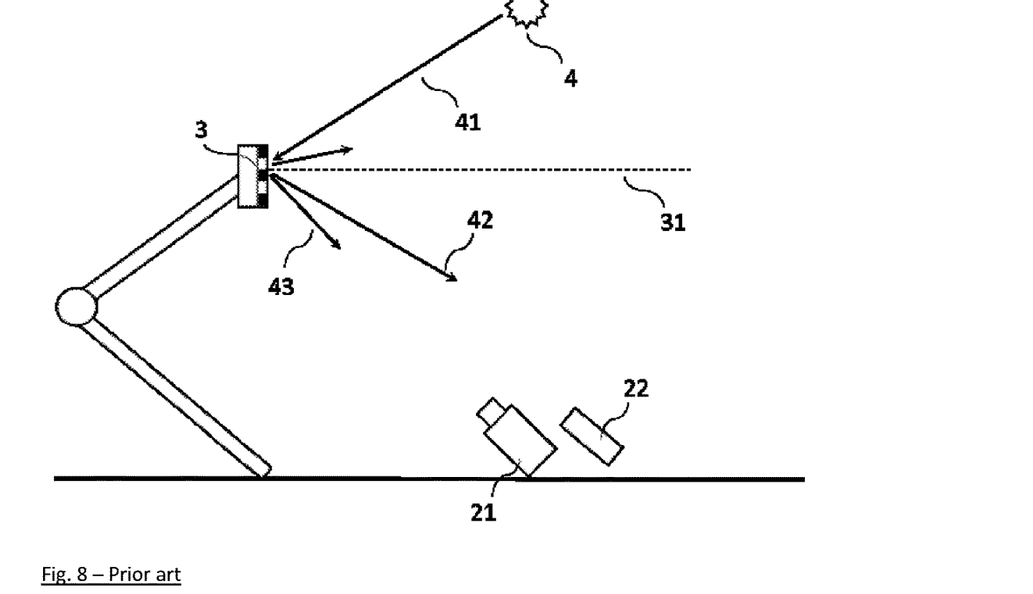

In the system shown, the camera can be reached by a ray of solar light reflected by the target. In fact, while the retroreflecting strips reflect almost the whole solar radiation along the same direction the solar radiation comes from, (and so not towards the camera), the target not retroreflecting portion reflects light according to the common optical laws, and so in some environmental conditions it will reflect light towards the camera. This is shown, schematically, in FIGS. 7 and 8. In FIG. 7 it is shown FIG. 2 taken from document EP2404777. In FIG. 8 it is shown a ray (41) emitted by the sun (4), which after being reflected by the flat target (3) in the reflected ray (43), can reach the camera (21). The just described disturbance linked to the reflected ray moves, in the images acquired by the camera, with the same frequency as the pantograph movement. In all the systems known at the state of the art, the target surface has to be necessarily of diffusive or diffusive-specular mixed kind, in order that there is surely a ray reflected from the laser, which can be intercepted by the camera, so that the target can be seen by the camera. Anyway, the camera sees the target thanks to the diffusive portion of this latter one. The alternative is that the target is retroreflecting, as in EP2404777, but in this case laser and camera have to be necessarily very close to each other in order that the device works.

SUMMARY OF THE INVENTION

The systems known at the state of the art are limited since, despite the usage of the target according to what just described, their effectiveness depends considerably on the environmental conditions of light where they work, which for such a system can be extremely variable.

Therefore, aim of the present invention is to provide a device able to measure without contact the position and acceleration of the pantograph sliding bow, which overcomes the drawbacks linked to the devices known at the state of the art. In particular, aim of the present invention is to provide a device able to carry out the measurement without contact of the position and acceleration of the sliding bow, which is reliable in any environmental condition of light. According to another aim, the present invention provides a method for determining the contact force between pantograph and catenary suspension line.

According to another aim, the invention provides a device able to measure without contact the position and acceleration of the pantograph sliding bow, whose performances are influenced neither by the position of the sun nor by the respective distance between the laser used as light source and the camera.

The invention realizes the aims since it is an optical system for measuring the position and acceleration of a pantograph sliding bow and the contact force between sliding bow and catenary suspension line, comprising: at least a camera installed on the ceiling of a railway vehicle and configured so that a region containing at least a portion of said sliding bow is framed; at least a laser focused on a laser sheet arranged on a substantially vertical plane and directed towards said pantograph, said laser sheet intersecting said region framed by said camera, characterized in that said system further comprises at least a cylindrical target installed integrally to said sliding bow and with axis parallel to the one of said sliding bow, in a position in which the target is lighted by the laser.

BRIEF DESCRIPTION OF THE DRAWINGS

Some preferred embodiments will be described in detail in the following, with reference to the appended FIGS. 1 to 6.

DETAILED DESCRIPTION OF THE INVENTION OR OF THE PREFERRED EMBODIMENTS

Figure 1:
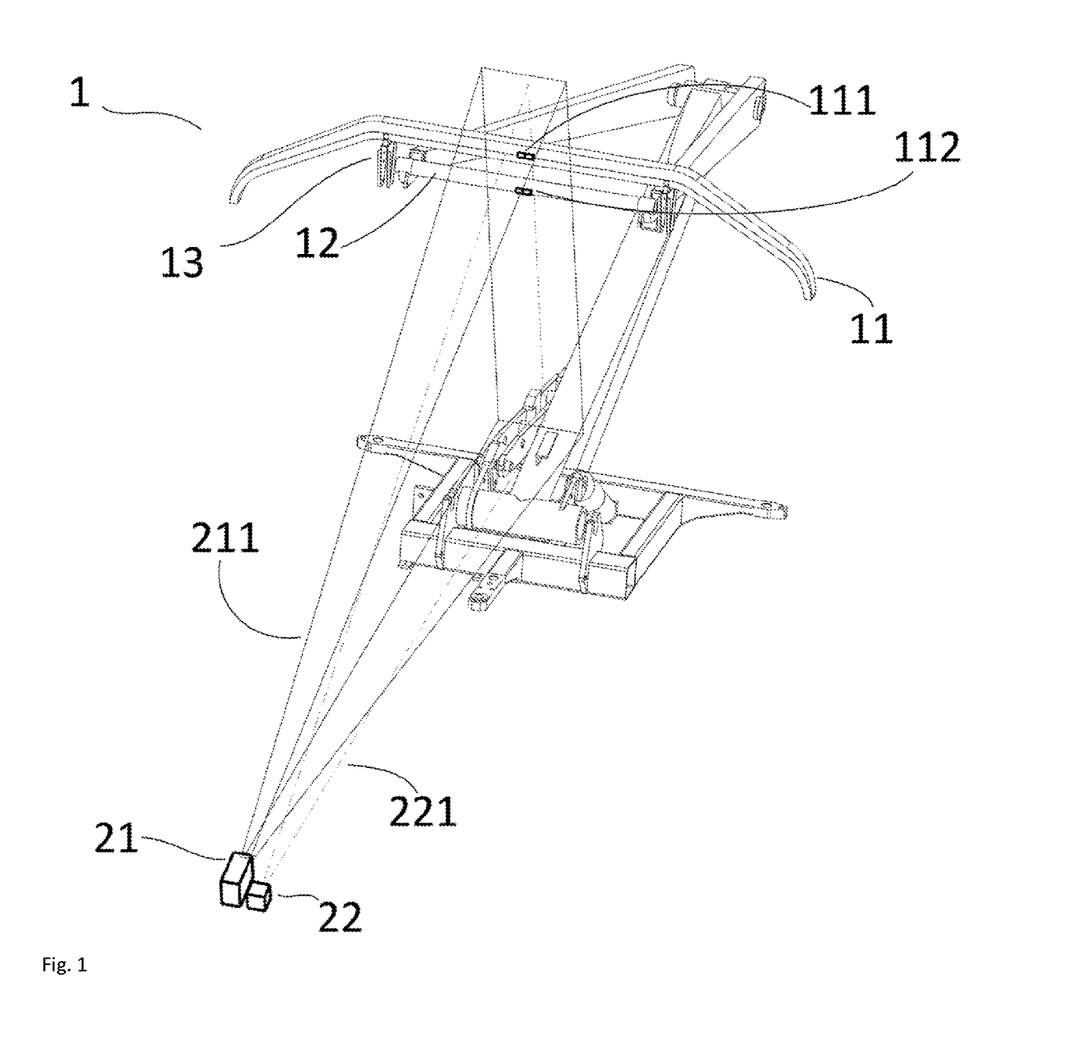
In FIGS. 1, 2 and 3 it is shown a first embodiment of the invention comprising a linear sensor camera, in an axonometric, section and detail view, respectively.
Figure 2:
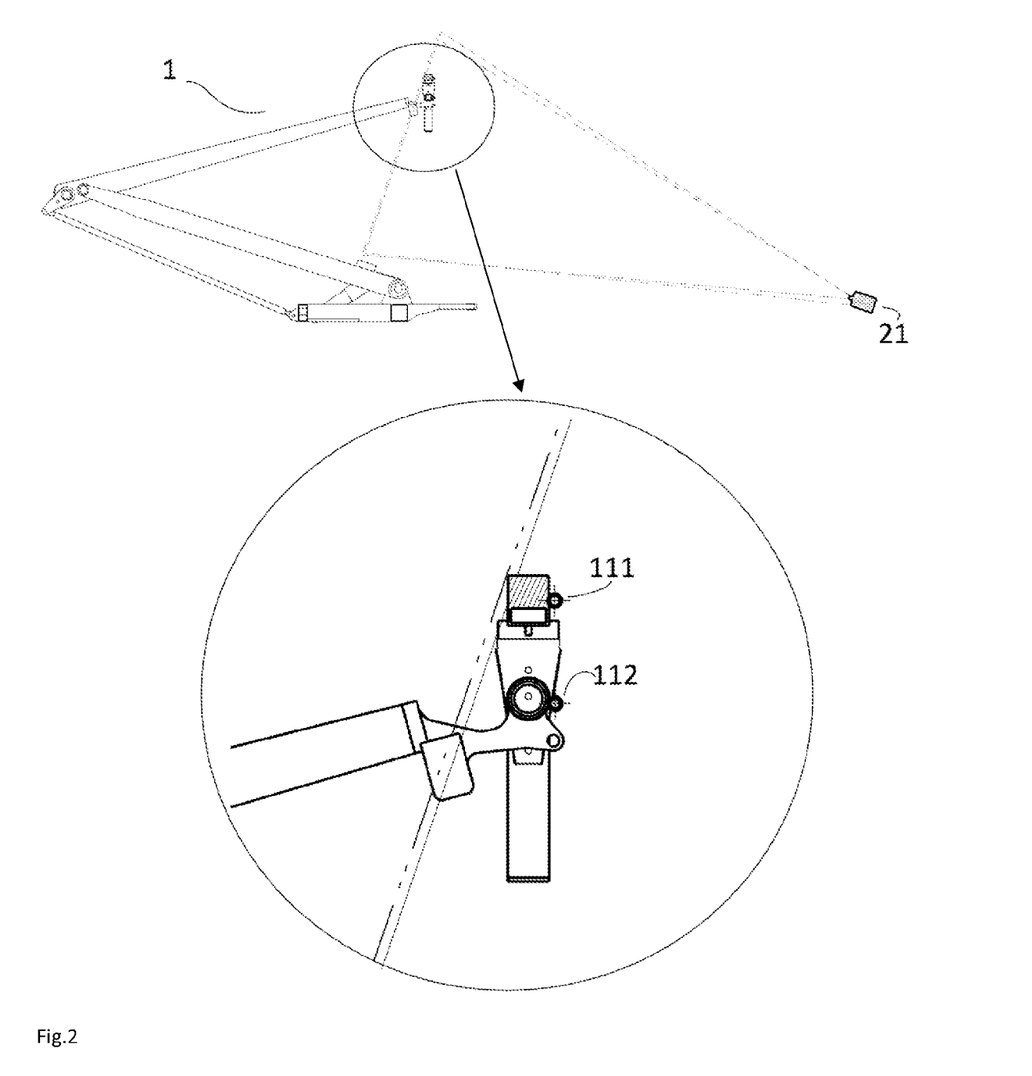
Figure 3:
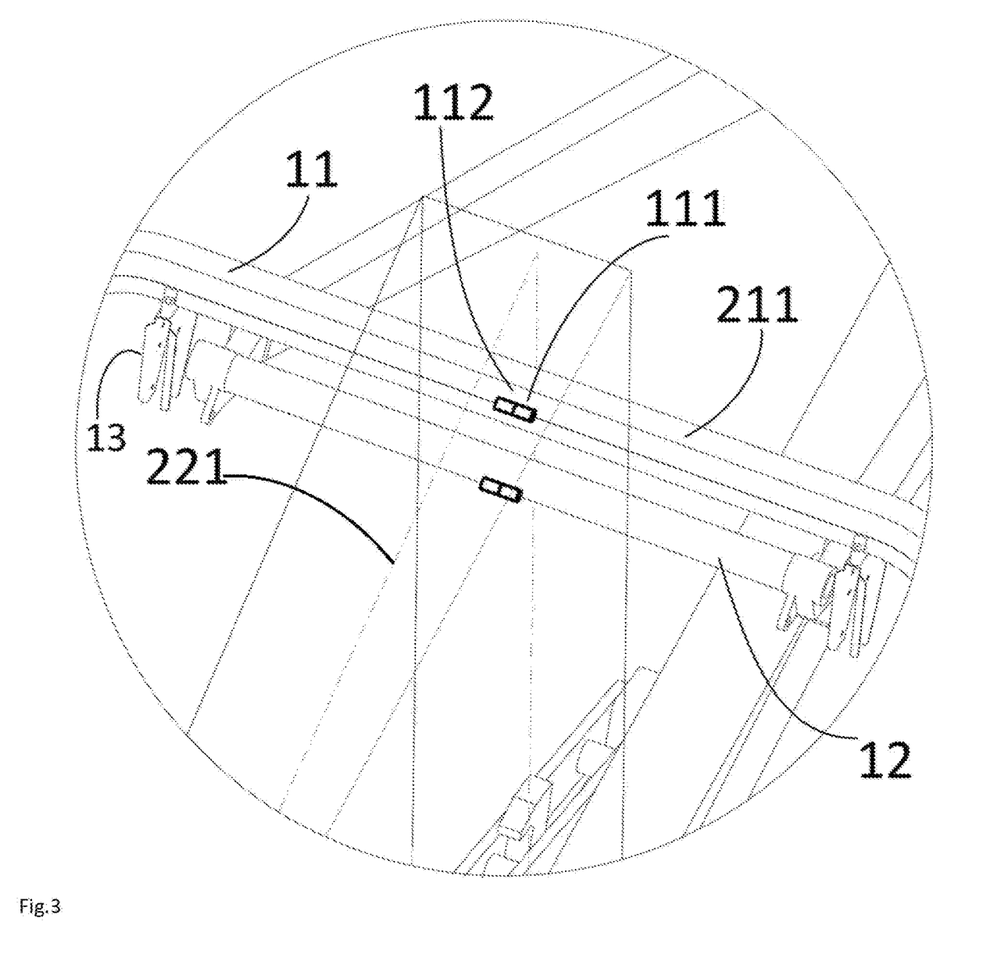

In FIG. 1 it is shown an axonometric view of a first preferred embodiment of the device according to the present invention. In particular the pantograph and the device are shown in their mutual positioning. Only for graphical clarity, it is not shown the ceiling of the railway vehicle to which they are both constrained integrally. As it is shown in FIG. 1, the pantograph (1) comprises a sliding bow (11) and a support (12) of the sliding bow. The sliding bow (11) is provided, in the surface facing upwards, with a conductive strip, called sliding, which, in working conditions, is in contact with the catenary suspension line. The sliding bow (11) and its support (12) are connected by means of a spring suspension (13).

In order to increase the intensity of light reflected towards the camera, on the pantograph (1) at least a cylindrical target (111) is installed integral to said sliding bow (11), and possibly also a target (112) integral to the support (12). The targets are positioned with their axis in parallel to said elements of the pantograph (1). The targets (111, 112) are realized in reflecting material to the frequency of laser (22) (whose usage is shown in the following), and preferably in stainless steel.

Figure 4:
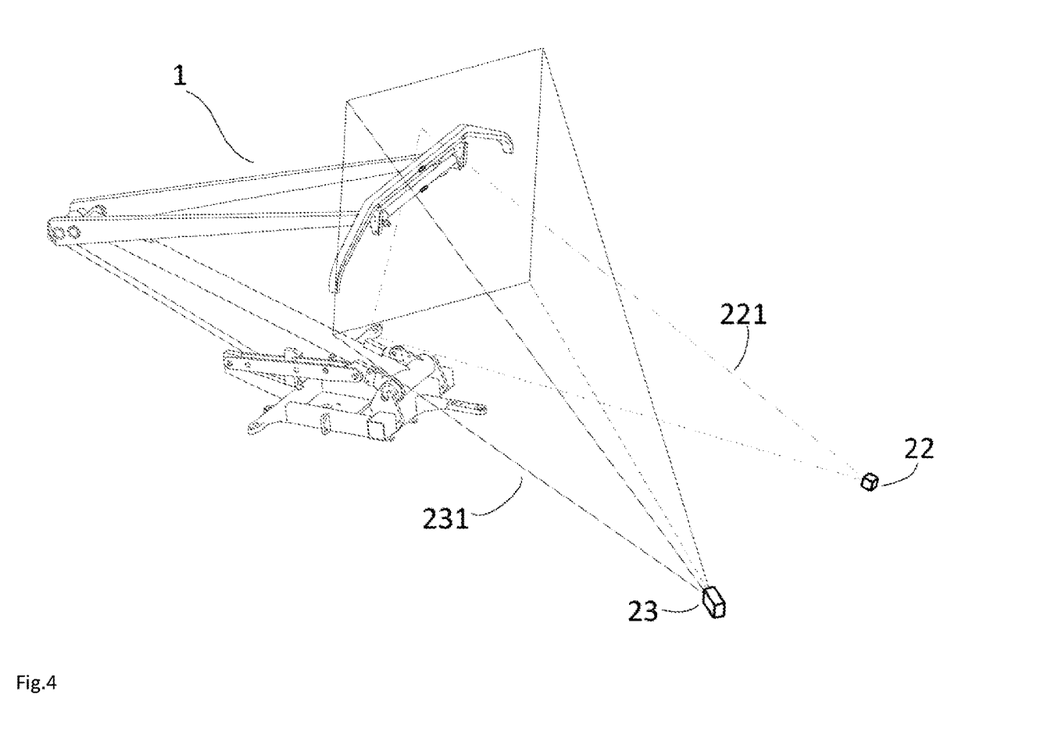
In FIGS. 4 and 5 it is shown a second embodiment of the invention, comprising a matrix sensor camera.

The device for measuring the pantograph position comprises a camera (21) and a laser (22). The optics of the laser (22) is such that the same is focused on a laser sheet (221) whose plane is shown in dotted line in FIG. 1. In FIG. 1 it is also shown in solid line the opening angle in the field of view (211) of the camera (21). The opening angle shown in FIG. 1 is schematically the one obtainable with a linear sensor camera and respective optics. In FIG. 4 it is schematized the usage of a camera with field of view (231) with greater opening angle, typically obtainable with a matrix camera (23) and respective optics.

The laser (22) is directed towards the pantograph (1) and the laser sheet (221) is arranged on a substantial vertical plane. With reference to the camera (21), its position has to be such that, at the pantograph the plane lighted by the laser sheet (221) is contained inside the field of view (211) of the camera (21).

In this way, the camera frames the portion of the pantograph (1) lighted by the laser, and in particular the cylindrical target (111) lighted by the laser. Preferably, laser (22) and camera (21) are positioned close to each other, so that they are easily installed pre-assembled inside a unique container (not shown in FIGURE). The laser (22) can be arranged next to the camera (21), as it is shown in FIG. 1, or it can be positioned over or under the same. As an alternative, is can be used a setup of kind shown in FIG. 4, in which laser and camera are spaced with respect to each other.

Figure 6:
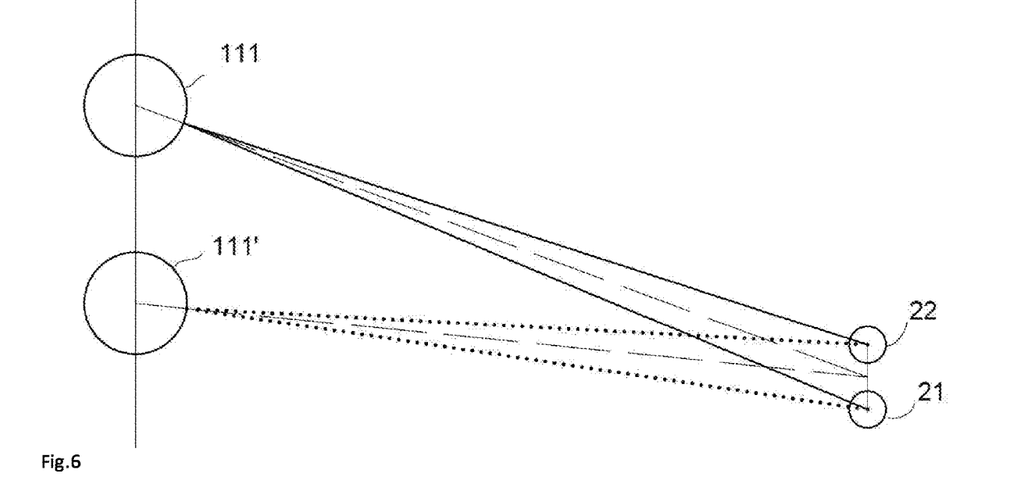
in FIG. 6 it is shown an illustrative geometrical schema describing the measuring principle.

The utility of cylindrical targets (111, 112) is clear with reference to the schema of FIG. 6, which shows a side view in which laser (22) and camera (21) are schematized as circles, and the cylindrical target is shown in a first (111) and a second position (111'). It is clear from the image that in all the positions the target (111) can take after that the pantograph is lowered, there exists an optical laser-target-camera path in which the camera receives the laser light by direct reflection. In fact, by joining the target center (111) with the middle point of the joiner of the positions of laser (22) and camera (21) it is individuated on the outer circumference of target a point such that the laser light is reflected in specular manner towards the camera, thus maximizing the intensity of radiation which arrives on the camera.

Always with reference to FIG. 6, it is clear that the point for which the laser light is reflected directly towards the camera is displaced on the outer surface of the target while varying the position of pantograph. This error is however absolutely systematic (it is repeated identically in all the pantograph lifting/lowering cycles), and so it can be eliminated with a simple preliminary procedure of calibration.

After describing the system geometrical configuration, it is now possible to describe its optical features.

As it is known, the laser is a monochromatic light source, this meaning that it emits light in a very limited spectral interval. Preferably, the laser (22) used in the system according to the present invention emits near infrared, and more preferably at wave length between 800 and 850 nm, to which the intensity of the solar light spectrum is lower.

The camera (21) is preferably provided with a bandpass interferential filter centered on the laser frequency, whose function is to filter the whole light arriving with frequencies outside the allowed band, and so, to exclude almost all the solar radiation as well as the radiation coming from artificial light sources.

Therefore, to the sensor of the camera there will arrive only:
- the laser light reflected in specular manner by the pantograph;
- the portion of solar radiation (when present) comprised in the band of wave length allowed by the filter.

By calibrating the laser power so that the first one of the two contributions enlisted is sensibly greater (at least one order of magnitude) than the second one, the sensor of the camera will detect only a peak of signal at the position of the pantograph, regardless of the environmental light conditions where it works.

Whether it is used a linear sensor camera or a matrix sensor camera, the obtained image has a very high signal/noise ratio, and it allows to determine immediately the position of target (and of pantograph).

Figure 5:
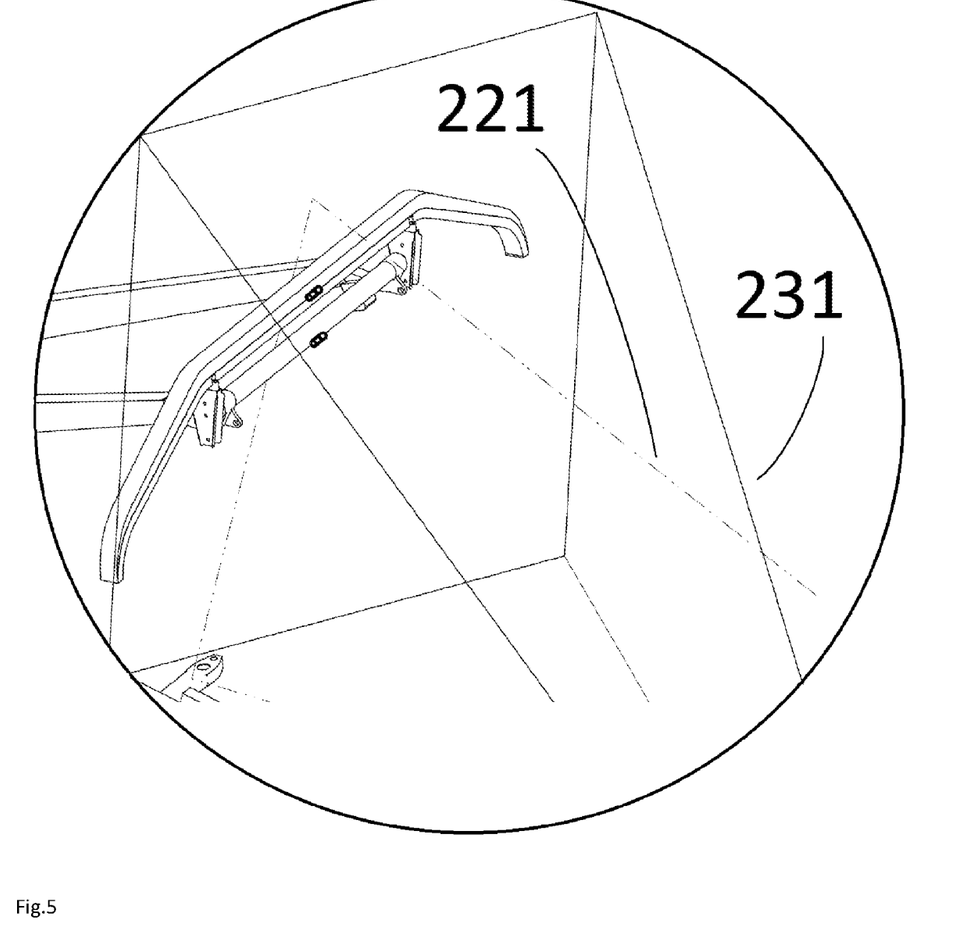

In FIGS. 4 and 5 it is shown a second embodiment for the present invention, in which it is used a matrix camera (23) instead of the linear camera (21). The field of view (231) of the matrix camera has an opening angle sensibly greater than the one of the linear camera. For this embodiment all the just described considerations are valid.

In addition, it is to be specified that the described device comprises acquiring and processing means of data detected by the camera, as well as control means of the camera and laser, conveniently installed on the train.

There are described also other embodiments of the device according to the present invention. In fact, in order to identify possible rotations of pantograph, on the sliding bow there can be installed two cylindrical targets, on which respective laser sheets are focused. The same can be done possibly for the support. The images of the region containing the two cylindrical targets can be acquired by means of two linear cameras, each one paired with a respective target and a respective laser sheet, or by means of a camera with matrix sensor and optics configured so that the whole region of interest is framed. In this way, it is possible to individuate the height of the sliding bow in two distinct points, and so, to identify a possible rotation of the same.

Figure 9:
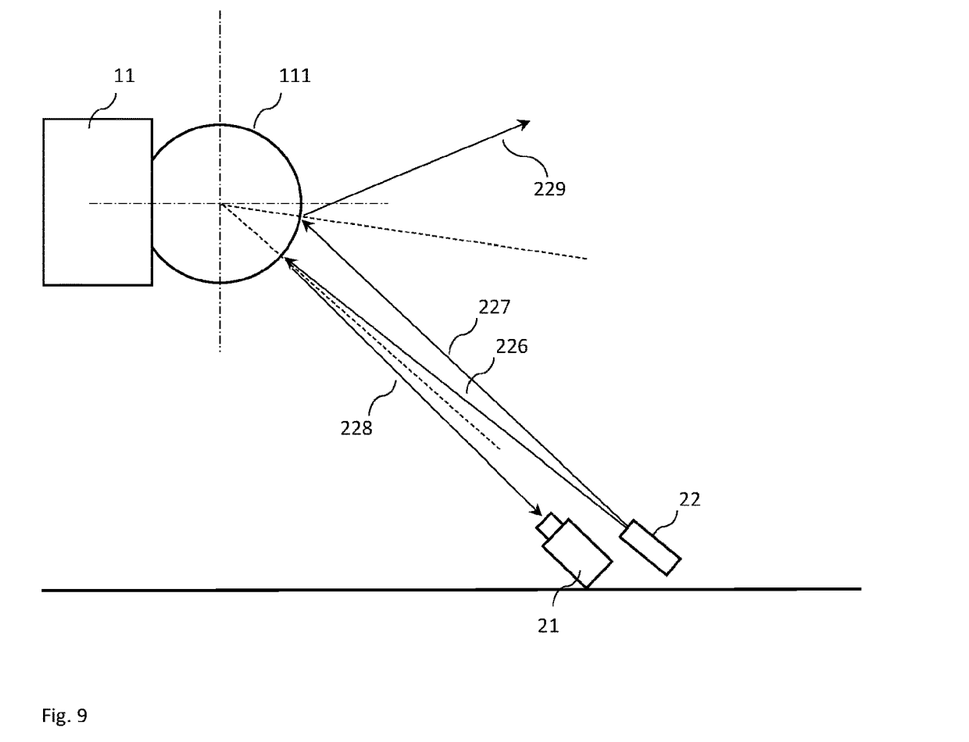
In FIG. 9 it is further schematized the geometm of a preferred embodiment of the device in lateral view.

In FIG. 9 it is further schematized the geometry of a preferred embodiment of the device. The target (111) is made up of a highly reflecting cylinder, preferably realized in polished stainless steel. The section of the cylinder is shown in FIG. 9 with a very much greater dimension than reality, to highlight the behavior from an optical point of view. The surface features of the cylinder make highly predominant the effect of specular reflection with respect to diffusion, so the target (11) is an almost perfect reflector for which the Snell reflection law is applied. The circular section guarantees that, among the plurality of rays (226, 227), emitted by the laser (22), there is surely a ray (226) which is reflected in specular manner in a ray (228) intercepted by the camera (21).

From simple considerations of geometrical optics, it is clear that for each height of the sliding bow (11) of the pantograph, and so for each height of the cylinder (111) integral to it, there always exists, and uniquely, the ray emitted by the laser (22) reflected in specular manner in the camera (21).

Figure 10:
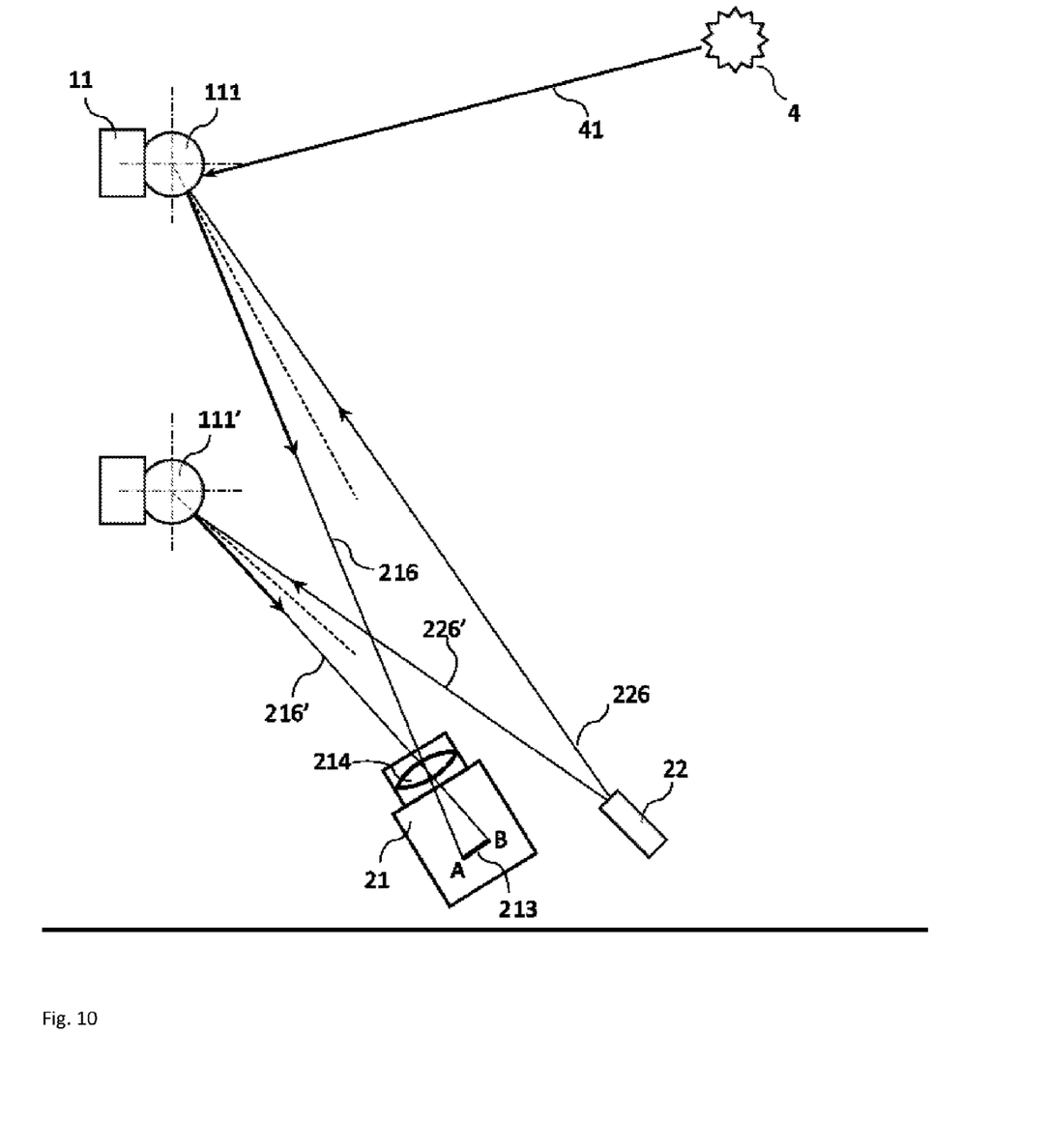
In FIGS. 10 and 11 further lateral views of a preferred embodiment are shown, to show that the unigueness of the ray reflected in specular manner is a sufficient condition not to be disturbed by the sun.

With the schema of FIG. 10, it is shown that the uniqueness of the ray reflected in specular manner is a sufficient condition not to be disturbed by the sun. There are to be considered in fact the two extreme positions (111) and (111') which the target can take: at such position there will be 2 univocal rays (226) and (226') emitted by the laser 22 which will be reflected in the camera (21) through the respective rays 216 and 216'. To maximize the resolution of the camera and so the precision of the measurement, the focal length of the objective (214) of the camera is chosen so that the extreme positions of the cylindrical target produce the images on the sensor (213) of the camera in the extreme points (A, B) of the same. So, it is assumed that all the rays of the laser beam not comprised between the two univocal rays (226, 226') will be projected on the points outside the sensor, and so will be not visible to the camera.

If it is considered the ray (41) emitted by the sun (4) and which is projected on the cylinder, it can be assumed, from simple considerations of geometrical optics, that, for any height of the cylinder between the extreme positions 111 and 111', such ray cannot be visible to the camera since it does not belong to the ray beam between 226 and 226'. While varying the height of the sun, considering the set up of the system of interest, there is no solar ray, reflected by the cylinder, belonging to the ray beam between 226 and 226'; so, the sun cannot generate in any way a disturbance signal on the camera, by reflection on the cylinder.

Figure 11:
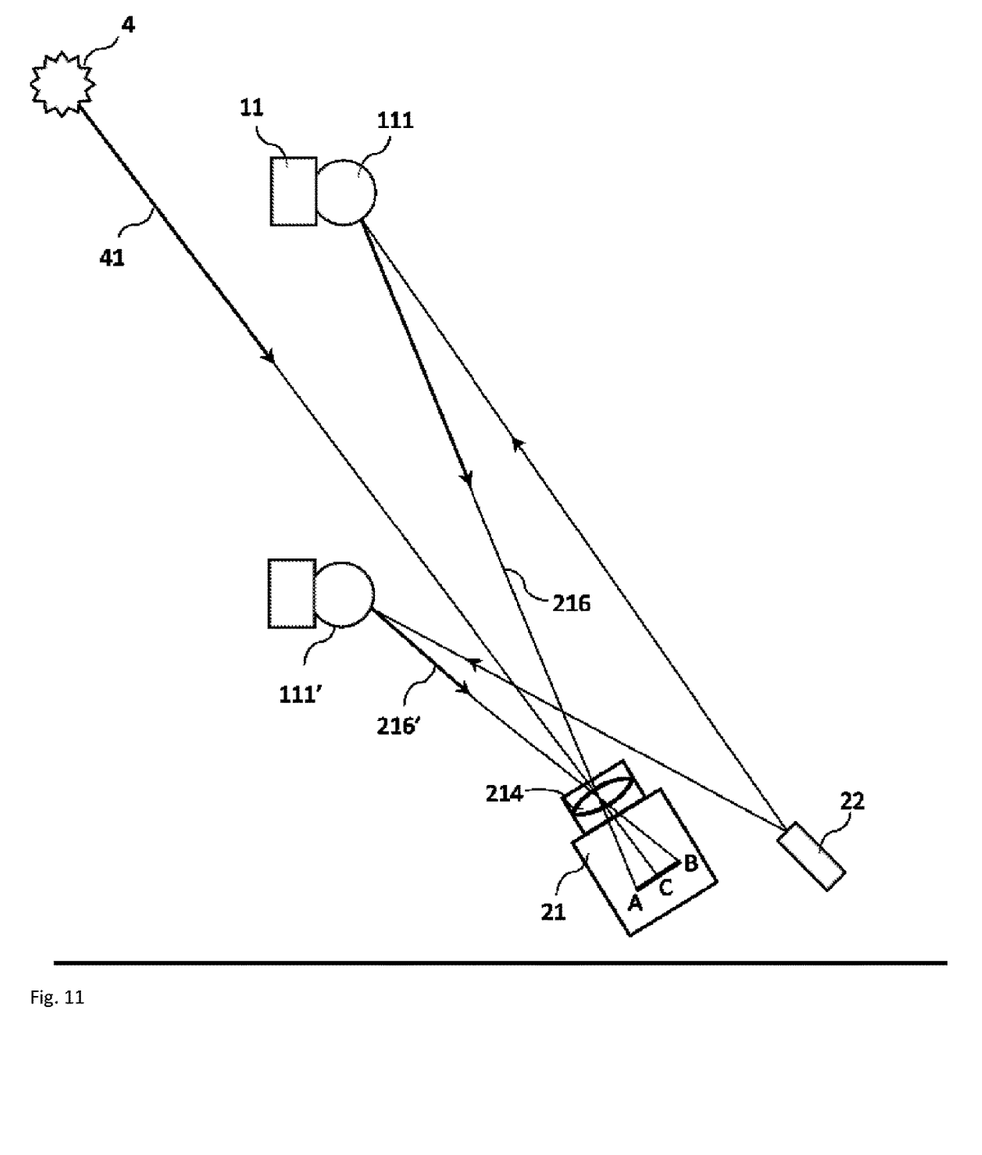

The unique ray of disturbance is caused by direct incidence, as it is shown in FIG. 11. In this case, the solar ray (41) is projected in the point C on the sensor of camera (21). Anyway since the cylinder moves with a time dynamics which is many orders of magnitude greater than the sun, the point C will appear practically in fixed position and so will be simply individuated and filtered by the image processing software. It is to be noted that the disturbance signal (43) of FIG. 8 is diffused by the target and produces an image moving on the sensor with the same time dynamics of target, therefore it cannot be recognized as solar reflection and so cannot be eliminated.

The present invention provides further a method for measuring the movement of the pantograph sliding bow, its acceleration and for determining the contact force between pantograph and catenary suspension line, by using the just described device.

The method for determining the position comprises the steps of:
a) constraining to pantograph (1) at least a cylindrical target (111) with axis parallel to the pantograph sliding bow;
b) lighting the pantograph with a laser light source (22), focused on a laser sheet (221) positioned in a vertical plane intersecting said target (111);
c) acquiring with a linear camera (21) or a matrix camera (23), provided with a frequency filter centered on the frequency of said laser (22), a plurality of images of the region containing the pantograph referred to following time instants;
d) identifying in each one of said images the pixels relating to the position of the target, and so, the height to the ceiling of the train of the same target, and so of the sliding bow, in each one of said following time instants;

e) calculating speed and acceleration of sliding bow on the basis of the position in time of the same, measured at point d.

In order to determine the contact force between sliding bow and catenary suspension line, it is to be considered that the same is the sum of the aerodynamic force exerted on the pantograph (function of the squared train speed and of the aerodynamic features of the pantograph), elastic force exerted by the suspension springs between sliding bow and its support (function of pantograph position and spring features) and inertia force (function of pantograph acceleration).

By knowing, by means of the method in points a) to e) the position and the acceleration of the sliding bow for each time instant and by knowing the force exerted by the suspension spring of the sliding bow in function of the position of the same, and the dependence law of aerodynamic force on the train speed, it is sufficient to acquire the speed of the train to estimate all the components of the contact force between pantograph and catenary suspension line, and so to calculate the resulting force. To do so it is needed to implement the method comprising the following steps of:

f) determining position and acceleration of the sliding bow in following time instants by means of the method according to steps a) through e).

g) calculating, for each considered time instant, the force exerted by the suspension spring (13) of said sliding bow (11) in function of the position of the same, determined at point f;

h) acquiring the speed of the railway vehicle and determining the aerodynamic force acting on said pantograph (1) in function of said speed in each time instant;

i) calculating, for each time instant, the inertia force acting on said sliding bow (1) in function of the acceleration calculated at point f;

j) calculating the force exchanged between sliding bow (11) and catenary suspension line in each time instant as the sum of the forces calculated at points g, h and i.

The invention claimed is:

1. An optical system for measuring position and acceleration of the sliding bow (11) of a pantograph (1), and the contact force between the sliding bow (11) and the catenary suspension line, comprising:
at least a camera (21) installed on the ceiling of a railway vehicle and configured so that a region containing at least a portion of said sliding bow (11) is framed;
at least a laser (22) focused on a laser sheet arranged on a vertical plane and directed towards said pantograph (1), said laser sheet intersecting said region framed by said camera (21);
and wherein said system further comprises at least a target (111) installed integrally to said sliding bow (11) in a position in which said target (111) is lighted by said laser (22) and framed by said camera (21), said target (111) being made of a material reflecting in a specular manner the frequency of the laser light emitted by said laser (22), and wherein said target (111) is cylindrical and installed with axis parallel to the one of said sliding bow, in a position in which said target (111) is lighted by said laser (22);
and wherein said system further comprises at least a second cylindrical target (112) installed integrally to the support (12) of said sliding bow (11), in a position in which said further target (112) is lighted by said laser (22) and framed by said camera (21),
and wherein said system is able to measure a position and acceleration of the pantograph sliding bow (11), and wherein said system performances are influenced neither by the sun's position nor by a respective distance between said laser (22) used as light source and said camera (21); thus the sun cannot generate a disturbance signal on said camera (21).

2. The optical system according to claim 1, wherein said at least two cylindrical targets (111) are installed integrally to the said sliding bow (11), said targets being lighted by laser sheets, respectively, and in that both said laser sheets intersect said region framed by said camera (21).

3. The optical system according to claim 1, wherein said at least two cylindrical targets (111) are installed integrally to the said sliding bow (11), said targets being lighted by laser sheets, respectively, and in that said system further comprises at least two cameras (21), each one of said laser sheets is intersecting a region framed by at least one of said cameras (21); and wherein said two cameras individuate the height of the sliding bow (11) in two distinct points, to identify a possible rotation of said sliding bow (11).

4. The optical system according to claim 1, wherein said laser (22) emits near infrared at a wave length between 800 and 850 nm.

5. The optical system according to claim 1, wherein said camera (21) is provided with a band-pass interferential filter, centered on the frequency of said laser (22), wherein a function of said filter is to filter whole light arriving with frequencies outside an allowed band, such as to exclude solar radiation and radiation coming from artificial light sources.

6. The optical system according to claim 1, wherein said camera (21) is a linear sensor camera.

7. The optical system according to claim 1, wherein said camera (21) is a matrix sensor camera having an opening angle greater than the one of a linear camera.

8. The optical system according to claim 1, wherein said target (111) and said another cylindrical target (112) are made of polished stainless steel, to make highly predominant the effect of specular reflection.

9. A method for measuring the movement of the sliding bow (11) of the pantograph (1) of a railway vehicle and its acceleration and for determining the contact force between the pantograph (1) and a catenary suspension line, by using the device cameras according to claim 1, said method comprising the steps of:
a) constraining to said pantograph (1) at least a cylindrical target (111) with axis parallel to the pantograph sliding bow;
b) lighting said pantograph (1) with a laser light source (22), focused on a laser sheet (221) positioned in a vertical plane intersecting said target (111);
c) acquiring with a linear camera (21) or a matrix camera (23) a plurality of images of the region containing said pantograph (1) referred to following time instants;
d) identifying in each one of said images the pixels relating to the position of said target (111), and so, determining the height to the ceiling of the train of said target (111) and said sliding bow, in each one of said following time instants;
e) calculating speed and acceleration of said sliding bow (11) on the basis of the position in time of the same, measured at point d.

10. The method according to claim 9, further comprising the steps of:
f) determining position and acceleration of the sliding bow in following time instants by means of the steps a through e;

g) calculating, for each considered time instant, the force exerted by a suspension spring (13) of said sliding bow (11) in function of the position of the same, determined at step f;
h) acquiring the speed of the railway vehicle and determining the aerodynamic force acting on said pantograph (1) in function of said speed in each time instant;
i) calculating, for each time instant, the inertia force acting on said sliding bow (1) in function of the acceleration calculated at step f;
j) calculating the force exchanged between sliding bow (11) and a catenary suspension line in each time instant as the sum of the forces calculated at steps g, h and i.

\* \* \* \* \*